(12) United States Patent
Ueno et al.

(10) Patent No.: US 12,337,925 B2
(45) Date of Patent: Jun. 24, 2025

(54) VEHICLE

(71) Applicant: KAWASAKI MOTORS, LTD., Akashi (JP)

(72) Inventors: Shusei Ueno, Akashi (JP); Ryoya Osa, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/363,190

(22) Filed: Aug. 1, 2023

(65) Prior Publication Data

US 2024/0043088 A1 Feb. 8, 2024

(30) Foreign Application Priority Data

Aug. 2, 2022 (JP) .................. 2022-123441

(51) Int. Cl.
    *B62K 23/04* (2006.01)
    *B62K 11/14* (2006.01)

(52) U.S. Cl.
    CPC .............. *B62K 23/04* (2013.01); *B62K 11/14* (2013.01)

(58) Field of Classification Search
None
See application file for complete search history.

(56) References Cited

U.S. PATENT DOCUMENTS

| 4,570,078 | A | * | 2/1986 | Yashima | ................ | H01H 9/26 |
|---|---|---|---|---|---|---|
| | | | | | | 180/272 |
| 2005/0035856 | A1 | * | 2/2005 | McMahon | ............. | B62K 11/14 |
| | | | | | | 340/693.9 |
| 2013/0133457 | A1 | | 5/2013 | Sakamoto et al. | | |
| 2020/0307739 | A1 | * | 10/2020 | Kouchi | ................ | B62J 50/22 |

FOREIGN PATENT DOCUMENTS

| EP | 2128010 A1 | 12/2009 | | |
|---|---|---|---|---|
| FR | 3019138 A1 | * | 10/2015 | ............. B62K 11/14 |
| JP | 2020-158061 A | 10/2020 | | |

\* cited by examiner

*Primary Examiner* — Vicky A Johnson
(74) *Attorney, Agent, or Firm* — PROCOPIO, CORY, HARGREAVES & SAVITCH LLP (57) ABSTRACT

There is provided a vehicle including: a grip to be operated rotationally; and a traveling operation switch including a pressed portion. The pressed portion has a portion extending in a direction perpendicular to a rotation axis of the grip. According to an aspect of the present disclosure, it is possible to provide a vehicle in which the traveling operation switch is easily operated even when the output adjusting grip is largely rotated to the output-increasing side.

18 Claims, 10 Drawing Sheets

VEHICLE

CROSS-REFERENCE TO RELATED APPLICATIONS

This application is based on and claims priority under 35 USC 119 from Japanese Patent Application No. 2022-123441 filed on Aug. 2, 2022, the contents of which are incorporated herein by reference.

TECHNICAL FIELD

The present disclosure relates to a vehicle including a traveling operation switch that is operated during traveling.

BACKGROUND ART

In the related art, there has been known a vehicle including a grip that is gripped and rotated by a rider and a switch that is operated during traveling. Patent Literature 1 discloses a vehicle like this type.

A hybrid vehicle disclosed in JP2020-158061A includes a handlebar that is operated for steering, and an output adjusting grip that adjusts an output of a propulsion power source by being rotated with respect to the handlebar.

The output adjusting grip is disposed on either a left side or a right side of the handlebar. Of the left side and the right side, a boost button is disposed on the same side as the output adjusting grip and rotates integrally with the output adjusting grip.

In the vehicle of JP2020-158061A, since a torque operating member rotates integrally with the output adjusting grip, the configuration is likely to be complicated.

SUMMARY OF INVENTION

The present disclosure provides a vehicle that can easily operate a traveling operation switch even when a grip is appropriately rotated to an output-increasing side, and can realize the easy operation by a simple configuration.

According to an illustrative aspect of the present disclosure, a vehicle includes: a grip to be operated rotationally; and a traveling operation switch including a pressed portion. The pressed portion has a portion extending in a direction perpendicular to a rotation axis of the grip.

As a result, even when the grip is gripped and appropriately rotated, a pressed portion of the traveling operation switch can be easily pressed by a thumb.

According to the present disclosure, it is possible to provide a vehicle in which the traveling operation switch is easily operated even when the output adjusting grip is largely rotated to the output-increasing side.

DESCRIPTION OF EMBODIMENTS

Figure 1:
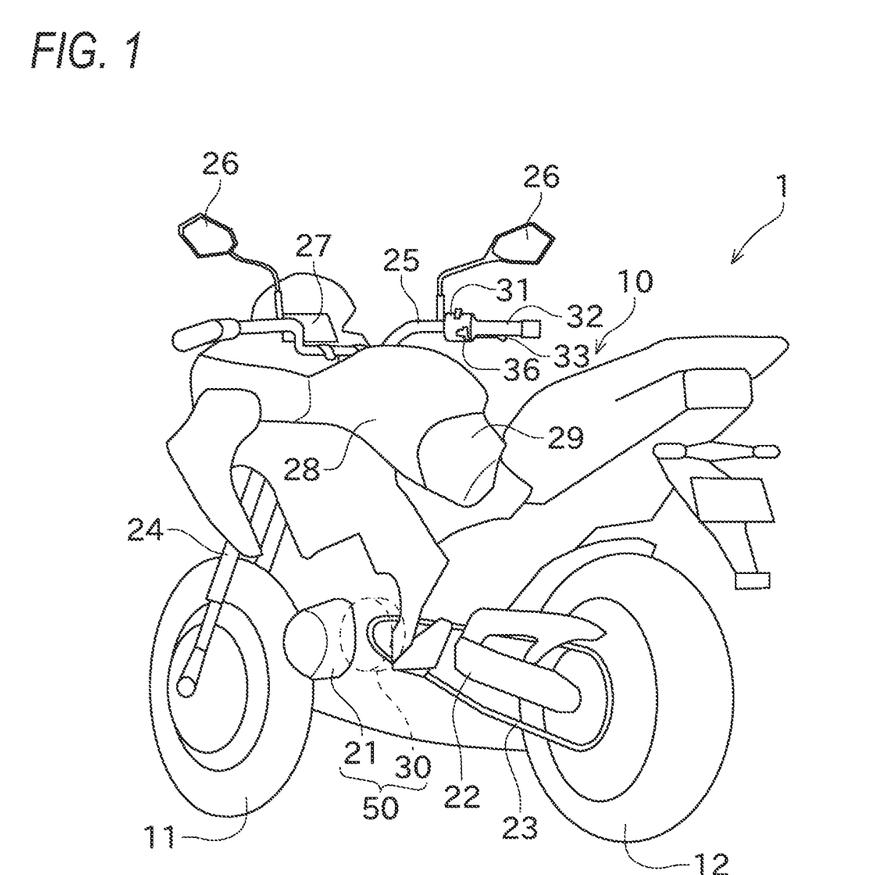
FIG. 1 is a rear perspective view showing an overall configuration of a motorcycle according to an embodiment of the present disclosure.
Figure 2:
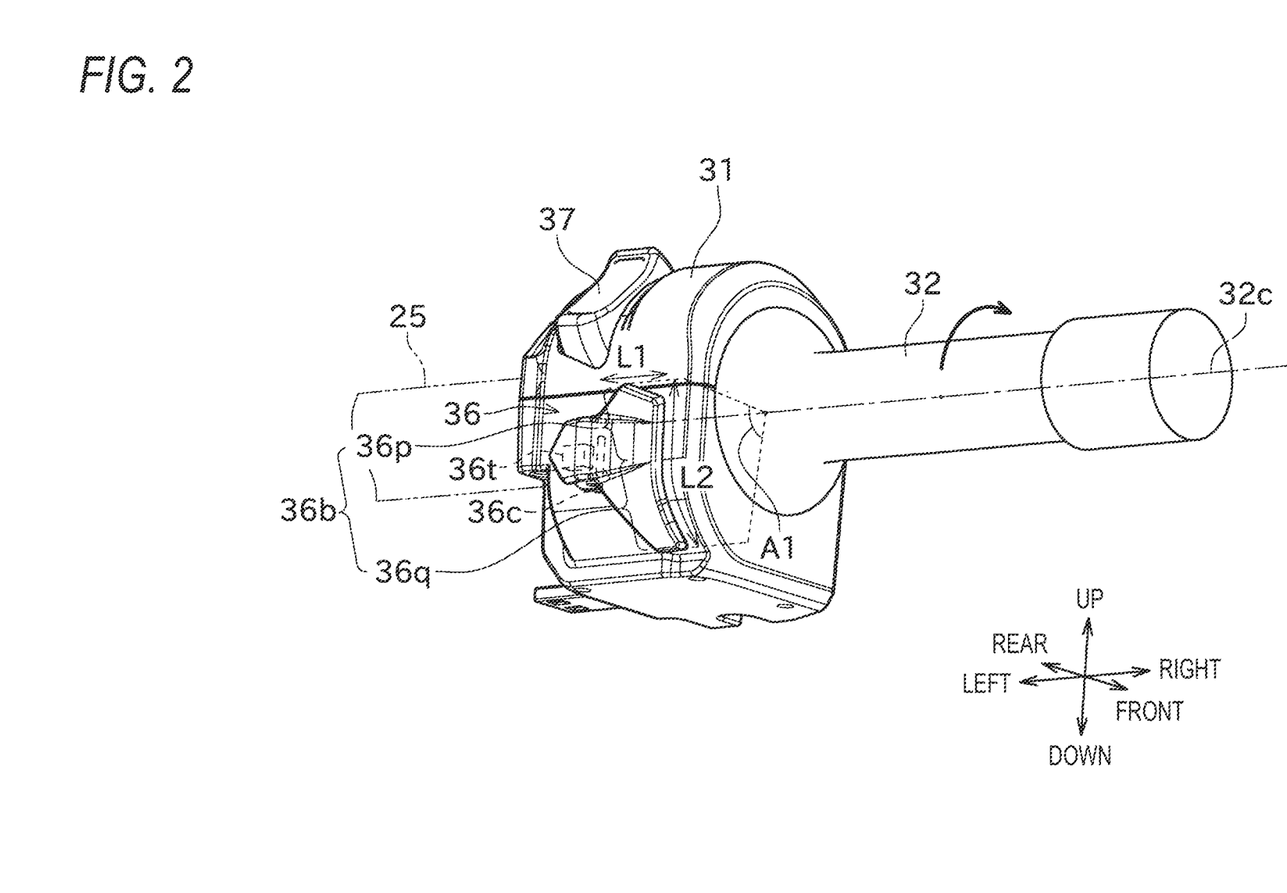
FIG. 2 is a perspective view showing an output adjusting grip, a case, and a boost switch when viewed from a rear surface.
Figure 3:
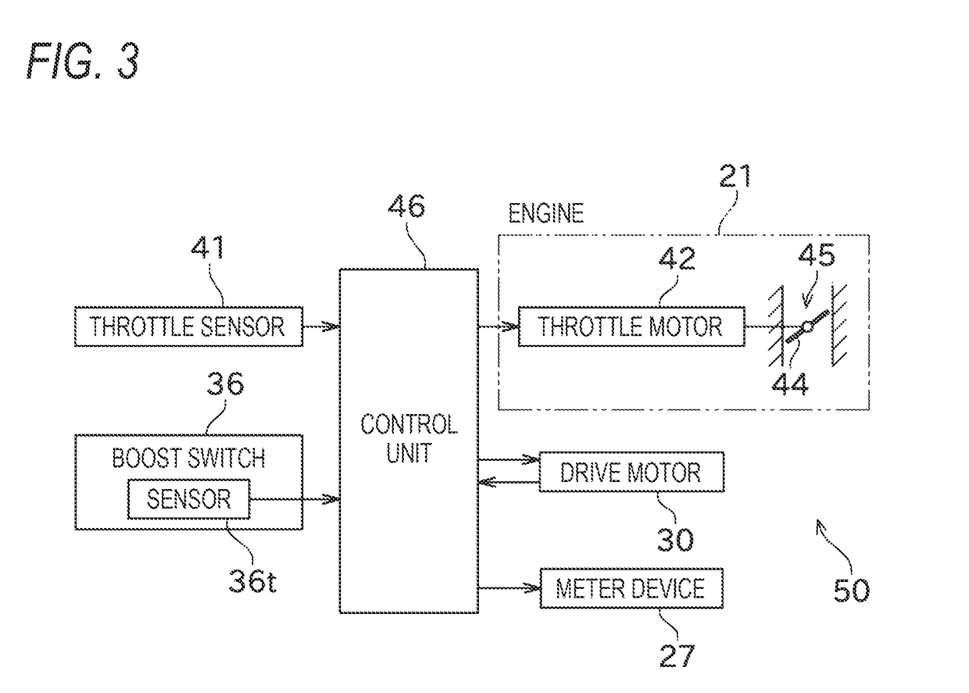
FIG. 3 is a block diagram showing an electrical configuration for controlling a hybrid drive source.
Figure 4:
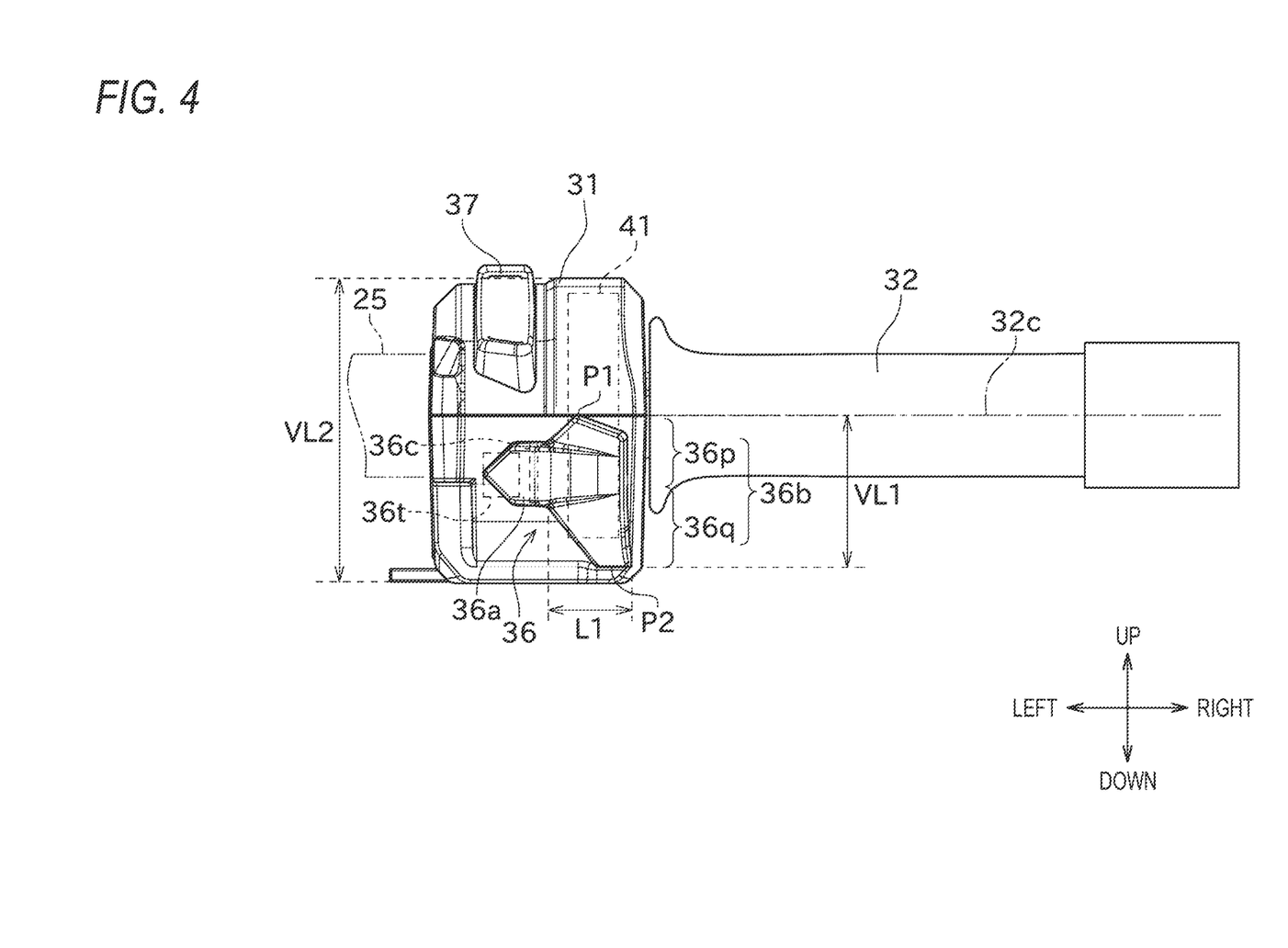
FIG. 4 is a rear view of the output adjusting grip, the case, and the boost switch.

Next, an embodiment of the present disclosure will be described with reference to the drawings. FIG. 1 is a rear perspective view showing an overall configuration of a motorcycle 1 according to an embodiment of the present disclosure. FIG. 2 is a perspective view showing an output adjusting grip 32, a case 31, and a boost switch 36. FIG. 3 is a block diagram showing an electrical configuration for controlling a hybrid drive source 50. FIG. 4 is a rear view of the output adjusting grip 32, the case 31, and the boost switch 36.

First, the motorcycle (vehicle) 1 will be described with reference to FIG. 1. In the following description, the terms "front", "rear", "left", and "right" refer to directions viewed from a rider riding on the motorcycle 1 unless otherwise specified. A front-rear direction corresponds to a vehicle length direction, and a left-right direction corresponds to a vehicle width direction. A vertical direction (up-down direction) corresponds to a height direction.

As shown in FIG. 1, the motorcycle 1 includes a vehicle body 10, a front wheel 11, and a rear wheel 12.

In the present embodiment, the motorcycle 1 includes an engine 21 and a drive motor 30 that drive the rear wheel 12 serving as a drive wheel. The engine 21 and the drive motor 30 correspond to the hybrid drive source (propulsion drive source) 50. Therefore, the motorcycle 1 is a hybrid vehicle. In the present embodiment, a hybrid system is adopted in which the motorcycle 1 can travel only by a driving force of the drive motor 30 even when the engine 21 is stopped. Depending on the situation, a driving force from either the engine 21 or the drive motor 30 is transmitted to the rear wheel 12 alone, or driving forces from both the engine 21 and the drive motor 30 are combined and transmitted to the rear wheel 12.

The engine 21 is provided near the center of the vehicle body 10 in the front-rear direction. In other words, the engine 21 is disposed between the front wheel and the rear wheel in the front-rear direction. In the present embodiment, the engine 21 is a gasoline engine, and generates a driving force using fuel stored in a fuel tank 28.

The drive motor 30 is disposed near the engine 21. The drive motor 30 is driven by a rechargeable battery (not shown) disposed at an appropriate position of the motorcycle 1. The rechargeable battery is configured in any way, and for example, a lithium-ion battery can be considered.

A swing arm 22 is disposed in a rear portion of the vehicle body 10. The rear wheel 12 is rotatably attached to a rear portion of the swing arm 22. The power generated by the hybrid drive source 50 is transmitted to the rear wheel 12 via a drive chain 23. With this configuration, the motorcycle 1 can travel.

Front forks 24 are attached to a front portion of the vehicle body 10 via an upper bracket (not shown), a lower bracket (not shown), and the like. The front forks 24 are disposed as a pair on left and right sides of the front wheel 11 such that the front wheel 11 are sandwiched therebetween in a front view. A predetermined steering axis is set between the left and right front forks 24. A handlebar 25 operated for steering is disposed near upper ends of the front forks 24. Grips to be gripped by the rider are formed at both ends of the handlebar 25 in the left-right direction. When the rider gripping the left and right grips rotates the handlebar 25 about the steering axis, the front wheel 11 turns via the front forks 24. Thus, a traveling direction of the motorcycle 1 can be changed.

A pair of left and right side mirrors 26 are disposed on left and right sides of the handlebar 25, respectively. A meter device 27 is disposed in front of the handlebar 25 and near the center in the vehicle width direction. The meter device 27 can display an engine rotational speed, a vehicle speed, a gear position, and other information.

The fuel tank 28 for storing fuel to be supplied to the engine 21 is disposed behind the handlebar 25 and above the engine 21. A seat 29 on which the rider sits is disposed behind the fuel tank 28. The fuel tank 28 and a section below the fuel tank 28 are sandwiched between knees of legs of the rider sitting on the seat 29. As a result, the body of the rider riding on the motorcycle 1 can be stabilized. By moving the center of gravity leftward or rightward in this state, the rider can lean the vehicle body 10 to smoothly steer the motorcycle 1.

As shown in FIGS. 1 and 2, a case (switch housing) 31 is fixed to a portion of the handlebar 25 near an outer side (specifically, a right side) in the left-right direction. In other words, the case 31 is disposed inward of the grips in the left-right direction. In the present embodiment, one of the two grips described above, specifically, the right grip, serves as the output adjusting grip 32 that adjusts the output of the propulsion drive source. Therefore, the output adjusting grip (grip) 32 is provided farther than the case 31 when viewed from the center in the left-right direction of the handlebar 25.

The output adjusting grip 32 is fixed to the outside of a cylindrical throttle tube (not shown). An end portion having a circular cross section of the handlebar 25 is inserted into the throttle tube. Therefore, the rider can rotate the output adjusting grip 32 about a rotation axis 32c parallel to a longitudinal direction of the handlebar 25. In other words, the output adjusting grip 32 is supported by the handlebar 25 so as to be angularly displaceable about an axis of a distal end of the handlebar 25.

As shown in FIG. 4, in the present embodiment, a throttle sensor (grip sensor) 41 capable of detecting an operation position of the throttle tube is disposed inside the case 31. The operation position of the throttle tube can also be referred to as an operation position of the output adjusting grip 32. The throttle sensor 41 is configured in any way, and may be, for example, a coil sensor or a Hall IC sensor that detects a rotation amount of an angular displacement body angularly displaced together with the output adjusting grip 32.

As shown in FIG. 3, the throttle sensor 41 is electrically connected to a control unit 46. The control unit 46 is implemented with a well-known computer. The control unit 46 can control the driving of the engine 21 and the drive motor 30 of the hybrid drive source 50 individually.

A throttle motor 42 and the drive motor 30 are electrically connected to the control unit 46. The throttle motor 42 functions as an actuator for driving a valve body 44 of a throttle valve 45 of the engine 21. The control unit 46 acquires a torque required by the rider (hereinafter, the torque may be referred to as required torque) based on an operation angle of the throttle tube (in other words, the output adjusting grip 32) detected by the throttle sensor 41. The control unit 46 controls the throttle motor 42 and the drive motor 30 so that a total output torque of the engine 21 and the drive motor 30 is equal to the required torque. In the engine 21, the throttle motor 42 changes an opening degree of the valve body 44 of the throttle valve 45. Thus, the amount of air taken into the engine 21 can be adjusted to change the torque generated by the engine 21. In the drive motor 30, the generated torque can be changed by performing known torque control.

As shown in FIG. 1, the handlebar 25 is provided with a front wheel brake lever 33 that the rider can grip and rotate with his/her right hand holding the output adjusting grip 32.

As shown in FIG. 2, the boost switch (traveling operation switch) 36 is provided on an end portion of the case 31 closer to the output adjusting grip 32 (an outer side in the vehicle width direction, a right side in the present embodiment). The boost switch 36 is disposed on a rear surface of the case 31.

The boost switch 36 will be described. The hybrid drive source 50 can change a relation between the operation position of the output adjusting grip 32 and the output torque (hereinafter, referred to as a torque output characteristic) by performing a predetermined operation. The torque output characteristic can be changed by the control unit 46 switching whether to add the drive of the drive motor 30 to the drive of the engine 21, or by the control unit 46 switching a ratio of the drive to be added. A control characteristic may be switched to increase an allowable current that can be supplied to the drive motor 30 only within a predetermined period.

The boost switch 36 is operated by the rider for issuing a command to change that the increase the torque output characteristic, as compared with the torque output characteristic before the boost switch 36 is operated. As shown in FIG. 3, the boost switch 36 is electrically connected to the control unit 46.

The change of the torque output characteristic to increase the output torque can be performed by various methods. For example, when only the engine 21 of the hybrid drive source 50 is driven, by driving the drive motor 30 while continuing to drive the engine 21, the torque output characteristic can be changed to increase the output torque. When both the engine 21 and the drive motor 30 are driven, by increasing the magnitude of a current to be supplied to the drive motor 30 while maintaining the output of the engine 21, the torque output characteristic can be changed to increase the output torque. Even when the engine 21 is stopped and the drive motor 30 is driven, by increasing the magnitude of the current to be supplied to the drive motor 30, the torque output characteristic can be changed to increase the output torque. By switching the torque output characteristic of the hybrid drive source 50 to increase the output torque, it is possible to obtain a strong acceleration for climbing a slope, traveling against a head wind, outrunning, and the like. In the present embodiment, an increase amount of the output torque in a boost mode is controlled to increase as a rotation angle of the output adjusting grip 32 increases.

When the boost switch 36 is pressed, the control unit 46 is switched from a normal mode to the boost mode. When the boost mode is implemented by increasing the output of the drive motor 30, it is preferable that the control unit 46 automatically returns from the boost mode to the normal mode after a predetermined time (for example, about several seconds) and returns the increase in the output of the drive motor 30 to the original state. As a result, it is possible to prevent a large current from flowing through the drive motor 30 for a long time, thereby protecting the drive motor 30 and a battery.

The boost switch 36 is disposed such that the boost switch 36 can be pushed with a thumb of a right hand of the rider gripping the output adjusting grip 32. When the boost switch 36 is pressed, the thumb generally moves toward the rotation axis 32c of the output adjusting grip 32 in a radial direction of the rotation axis 32c. The boost switch 36 includes a pressed portion 36b pressed by the thumb of the rider. The pressed portion 36b of the boost switch 36 can be pushed toward the rotation axis 32c. In other words, the pressed portion 36b is supported by the case 31 so as to be movable in the radial direction with respect to the rotation axis 32c.

When viewed from the rear surface, as shown in FIG. 4, the boost switch 36 has a T-shape turned sideways. The boost switch 36 includes a support portion 36a and the pressed portion 36b described above.

When viewed from the rear surface, the support portion 36a is formed elongated and substantially parallel to the rotation axis 32c of the output adjusting grip 32. The pressed portion 36b is formed elongated and substantially perpendicular to the rotation axis 32c. In other words, the pressed portion 36b is formed to have a dimension in a circumferential direction (a dimension in the up-down direction) around the rotation axis 32c larger than a dimension in the left-right direction. One end portion in a longitudinal direction of the support portion 36a is connected to a middle portion in a longitudinal direction of the pressed portion 36b. The boost switch 36 can be made of synthetic resin, for example. The support portion 36a and the pressed portion 36b are integrally formed. When viewed from the rear surface, the boost switch 36 is disposed in a region inside the case 31.

The support portion 36a is supported by the case 31 via a fulcrum shaft 36c provided in the middle portion in the longitudinal direction of the support portion 36a. The support portion 36a has a portion that enters inside the case 31. When viewed from the rear surface, the fulcrum shaft 36c is oriented substantially perpendicularly to the rotation axis 32c of the output adjusting grip 32c. Although the fulcrum shaft 36c is disposed inside the case 31 in the present embodiment, the fulcrum shaft 36c may be disposed outside the case 31. The pressed portion 36b is disposed closer to the output adjusting grip 32 than the fulcrum shaft 36c. As the rider presses the pressed portion 36b with the thumb, the boost switch 36 swings about the fulcrum shaft 36c.

Figure 6:
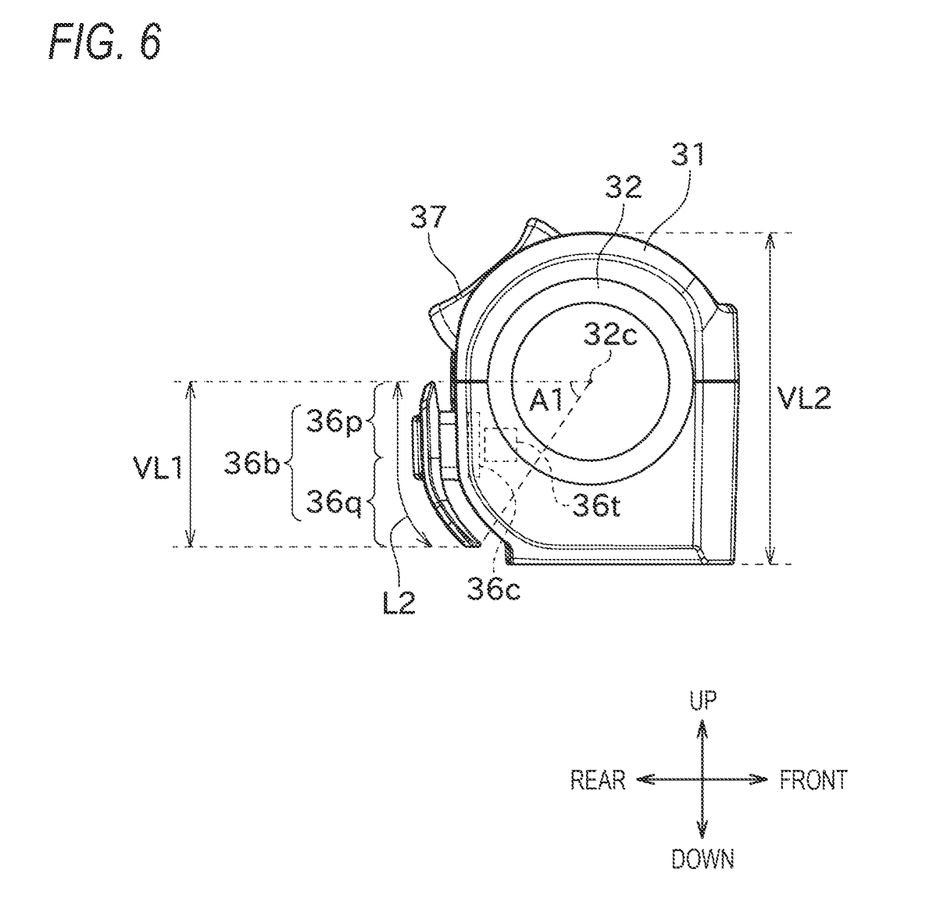
FIG. 6 is a side view of the output adjusting grip, the case, and the boost switch as viewed along a rotation axis of the output adjusting grip.

As shown in FIG. 6, in a state where no operating force is applied, the pressed portion 36b and the case 31 are disposed at an interval in the radial direction of the rotation axis 32c of the output adjusting grip 32. The pressed portion 36b is displaced toward the case 31 by being pressed by the rider with the thumb.

A sensor 36t for detecting an operation of the boost switch 36 is disposed inside the case 31. The sensor 36t is implemented with an electric switch, for example. The sensor 36t is electrically connected to the control unit 46 shown in FIG. 3.

A biasing spring is disposed at an appropriate position of the boost switch 36 (for example, near the fulcrum shaft 36c). The boost switch 36 is biased in a direction in which the pressed portion 36b is away from the case 31 by the elastic force of the biasing spring. When no operating force is applied, the pressed portion 36b is at a predetermined initial position by the biasing force. When pressed by the rider with the thumb against the biasing force, the pressed portion 36b moves from the initial position toward the rotation axis 32c in the radial direction of the rotation axis 32c. When the pressing by the thumb is released, the pressed portion 36b moves away from the rotation axis 32c in the radial direction and returns to the initial position.

To increase the output torque of the motorcycle 1, the rider pushes the pressed portion 36b toward the case 31 with the thumb against the elastic force of the biasing spring. As a result, the boost switch 36 is angularly displaced, so that a portion of the support portion 36a opposite to the pressed portion 36b with respect to the fulcrum shaft 36c moves away from the case 31. The sensor 36t detects the movement and outputs an electric signal to the control unit 46.

Figure 5:
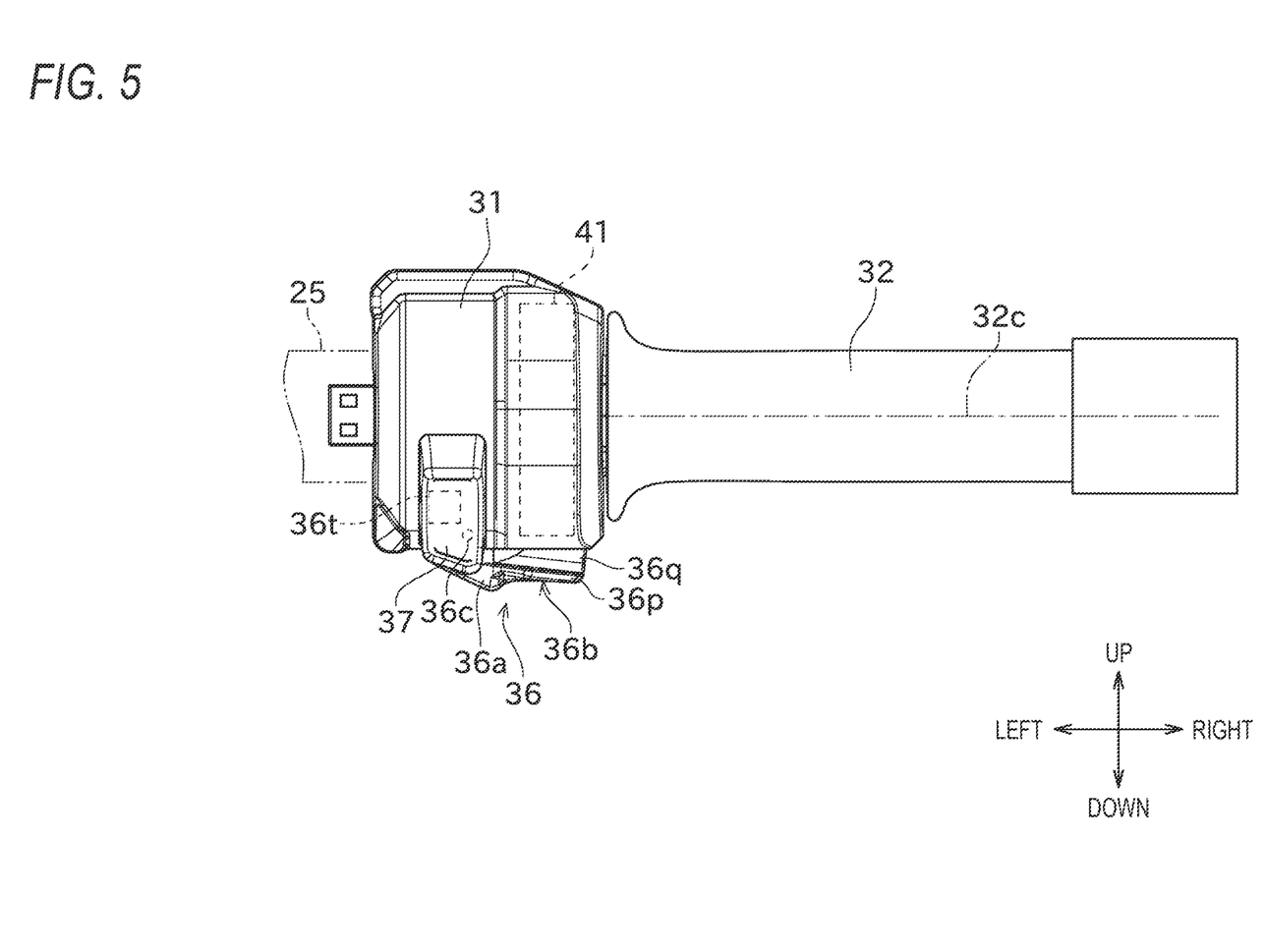
FIG. 5 is a plan view of the output adjusting grip, the case, and the boost switch.

The pressed portion 36b of the boost switch 36 will be described in detail. FIG. 5 is a plan view of the output adjusting grip 32, the case 31, and the boost switch 36. FIG. 6 is a side view of the output adjusting grip 32, the case 31, and the boost switch 36 as viewed along the rotation axis 32c of the output adjusting grip 32.

For example, as shown in FIG. 6, the pressed portion 36b includes a first portion 36p extending along a tangential direction of the output adjusting grip 32 and a second portion 36q extending along a circumferential direction of the output adjusting grip 32. Both the first portion 36p and the second portion 36q extend in a direction perpendicular to the rotation axis 32c.

As shown in FIG. 6, when the boost switch 36 is viewed along the rotation axis 32c, the first portion 36p is formed in a linear shape, and the second portion 36q is formed in a curved shape. The direction in which the first portion 36p extends is substantially parallel to a direction in which the fulcrum shaft 36c extends. The second portion 36q is formed in a substantial arc shape. The first portion 36p and the second portion 36q are smoothly connected.

The pressed portion 36b is mainly elongated in the up-down direction. As shown in FIG. 6, a dimension VL1 of the pressed portion 36b in the up-down direction is ⅓ or more of a dimension VL2 of the case 31 in the up-down direction (VL1≥VL2/3). When considering an angle range A1 of the pressed portion 36b with respect to the rotation axis 32c of the output adjusting grip 32, the angle range A1 is ⅓ or more of a rotation angle range of the output adjusting grip 32. The angle range A1 may be, for example, 300 or more. In the present embodiment, a length L2 of the pressed portion 36b in the direction perpendicular to the rotation axis 32c of the output adjusting grip 32 is 2 cm or more.

A boost command is often issued when the output adjusting grip 32 is rotated by a certain degree in a direction of a thick arrow in FIG. 2. As the output adjusting grip 32 is rotated, the hand of the rider gripping the output adjusting grip 32 also rotates about the rotation axis 32c. The pressed portion 36b of the boost switch 36 is formed to have a sufficient length substantially in the circumferential direction of the rotation axis 32c of the output adjusting grip 32. As a result, when the output adjusting grip 32 is rotated to any angular position, the boost switch 36 can be reliably operated by simply moving the thumb in the same manner.

As described above, the pressed portion 36b extends in a direction perpendicular to the rotation axis 32c of the output adjusting grip 32. Specifically, as shown in FIG. 2, regarding the pressed portion 36b, a dimension L2 in the direction perpendicular to the rotation axis 32c is larger than a dimension L1 in a direction along the rotation axis 32c (L1<L2). As a result, it is possible to easily operate the boost switch 36 over a wide operation range of the output adjusting grip 32 with a compact configuration.

As shown in FIG. 4, the pressed portion 36b of the boost switch 36 is also disposed below the rotation axis 32c of the output adjusting grip 32. As a result, it is easy to operate the pressed portion 36b with the thumb of the hand gripping the output adjusting grip 32.

The fulcrum shaft 36c described above is disposed farther from the output adjusting grip 32 than the pressed portion 36b. As a result, it is easy to dispose the pressed portion 36b in the vicinity of the output adjusting grip 32 and in an elongated shape in a direction perpendicular to the rotation axis 32c of the output adjusting grip 32.

The sensor 36t for detecting the operation of the boost switch 36 is disposed farther from the output adjusting grip 32 than the pressed portion 36b. On the other hand, the throttle sensor 41 is disposed at an end portion of the case 31 closer to the output adjusting grip 32. Therefore, the sensor 36t and the throttle sensor 41 can be compactly disposed inside the case 31.

As described above, the support portion 36a of the boost switch 36 is supported by the case 31 via the fulcrum shaft 36c. As shown in FIG. 4, the support portion 36a of the boost switch 36 is disposed inward of end portions P1 and P2 of the pressed portion 36b in the direction perpendicular to the rotation axis 32c of the output adjusting grip 32. As a result, it is possible to prevent distances between the support portion 36a of the boost switch 36 and the end portions P1 and P2 of the pressed portion 36b from becoming excessively long. Therefore, even if the upper end P1 or the lower end P2 of the pressed portion 36b is pressed by the rider, a force in a twisting direction is hardly applied to the support portion 36a. Therefore, smooth operation of the boost switch 36 can be implemented and the durability of the boost switch 36 can be enhanced.

The support portion 36a is freely positioned between the upper end P1 and the lower end P2. To prevent the force in the twisting direction from being applied to the support portion 36a, it is preferable to determine which portion of the elongated pressed portion 36b is to be frequently pressed. In the present embodiment, the support portion 36a is disposed slightly biased upward from a position that bisects the length in a longitudinal direction of the pressed portion 36b, but the present invention is not limited thereto.

As shown in FIG. 2 and the like, the support portion 36a is disposed to protrude rearward compared to the pressed portion 36b.

As shown in FIG. 2, the case 31 is provided with a kill switch (stop operation switch) 37 for issuing an operation other than changing the torque output characteristic.

Of the left side and the right side of the vehicle body 10, the boost switch 36 and the kill switch 37 are disposed on the same side as the output adjusting grip 32. The boost switch 36 and the kill switch 37 correspond to operating members operated by the rider to issue a command to the motorcycle 1.

The kill switch 37 is operated to issue a command of forced stop of the engine 21. The case 31 on which the boost switch 36 and the kill switch 37 are disposed is fixed to the handlebar 25. The kill switch 37 is disposed on an upper surface of the case 31.

The pressed portion 36b of the boost switch 36 is disposed away from the kill switch 37 in both the direction along the rotation axis 32c of the output adjusting grip 32 and the circumferential direction of the output adjusting grip 32. Therefore, for example, it is possible to reduce an operation error of operating the kill switch 37 when the boost switch 36 should be operated.

In the up-down direction, an upper end portion of the pressed portion 36b extends to the same position as the rotation axis 32c of the output adjusting grip 32. Therefore, even when the output adjusting grip 32 is not rotated, it is easy to press the pressed portion 36b with the thumb.

A portion that is the middle portion in the longitudinal direction of the pressed portion 36b and corresponds to a connection portion with the support portion 36a is formed thicker than other portions. As a result, the rigidity can be increased and deformation of the pressed portion 36b can be prevented. A step is appropriately formed in the pressed portion 36b at a boundary between the thick portion and a thin portion.

The boost switch 36 has a color different from that of the case 31. In the present embodiment, the case 31 is colored in black, whereas the boost switch 36 is colored in a chromatic color, for example, green. As a result, the boost switch 36 is visually conspicuous and the operation of the rider is facilitated.

The kill switch 37 overlaps the support portion 36a of the boost switch 36 in the direction of the rotation axis 32c of the output adjusting grip 32. As a result, it is possible to prevent the case 31 from increasing in size.

Figure 7:
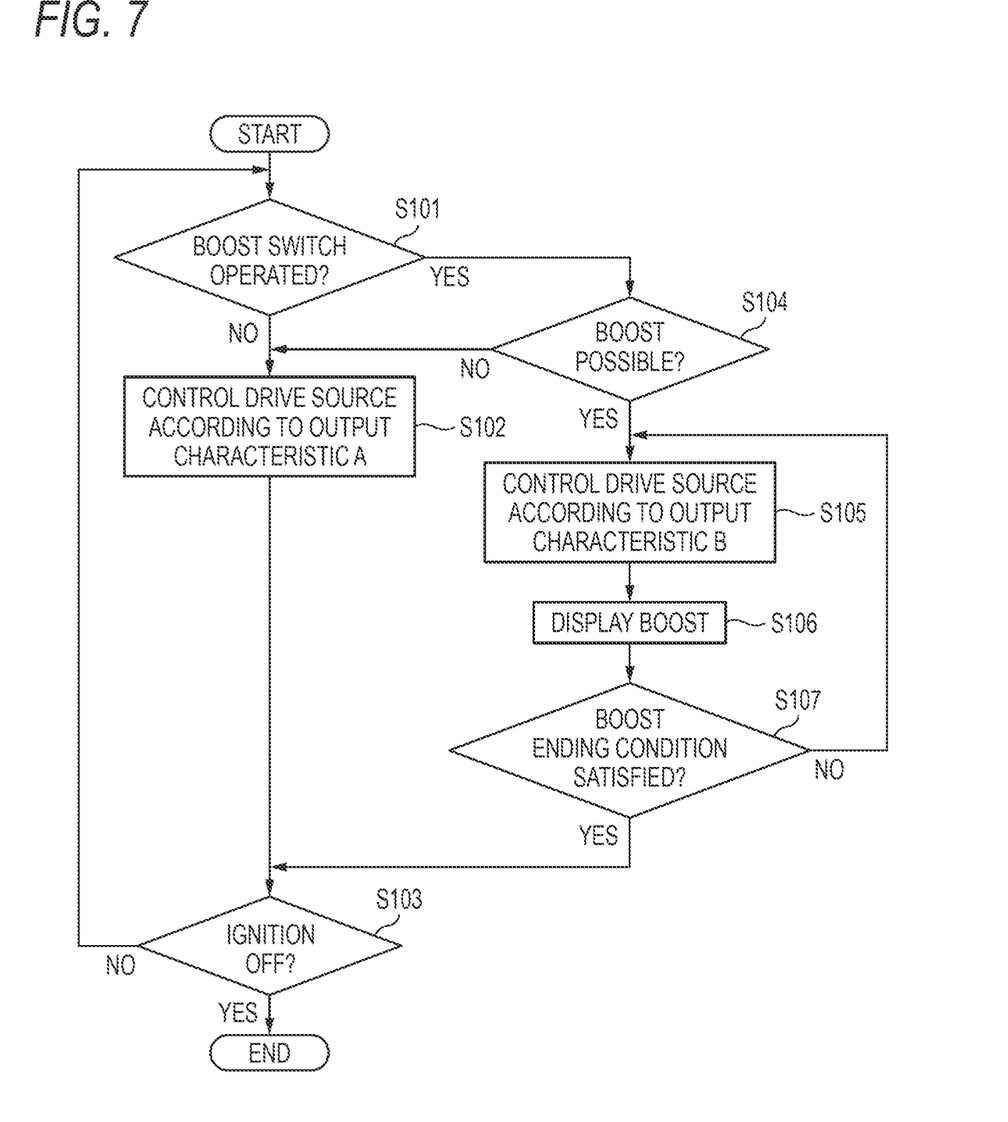
FIG. 7 is a flowchart illustrating a process performed by a control unit in relation to a boost process.

Next, an example of a boost process performed by the control unit 46 will be described with reference to FIG. 7. FIG. 7 is a flowchart illustrating a process performed by the control unit 46 in relation to the boost process.

When the process is started, the control unit 46 determines whether the boost switch 36 is operated based on a detection result of the sensor 36t (step S101).

When determining in step S101 that the boost switch 36 is not operated, the control unit 46 controls the engine 21 and the drive motor 30 according to an output characteristic A which is a normal output characteristic (step S102).

Thereafter, the control unit 46 checks a state of an ignition switch (not shown) (step S103). When the ignition switch is off, the process ends. When the ignition switch is on, the process returns to step S101.

When determining in step S101 that the boost switch 36 is operated, the control unit 46 determines whether the torque output characteristic can be changed to increase the output torque (hereinafter, may be referred to as boost) (step S104). The determination can be performed based on, for example, the battery temperature, the remaining amount of charge, and the temperature of the drive motor 30, but is not limited thereto. The determination criteria may include whether an abnormality has occurred in various devices. When the control unit 46 determines in step S104 that boosting is impossible, the process proceeds to step S102.

Figure 8:
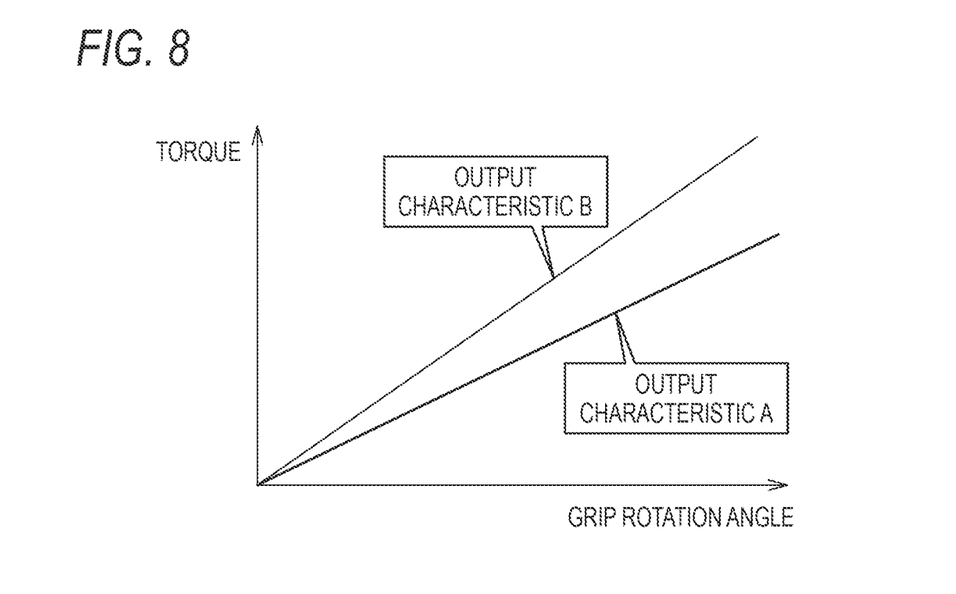
FIG. 8 is a graph showing a first example relating to a change in an output characteristic.

When determining in step S104 that boosting is possible, the control unit 46 controls the engine 21 and the drive motor 30 according to an output characteristic B different from the output characteristic A (step S105). An example of the two output characteristics is shown in FIG. 8. As shown in FIG. 8, the output characteristic B is such that the output torque is changed so as to be increased, as compared with the output characteristic A. In the example of FIG. 8, the output characteristic B is larger than the output characteristic A in relation to the inclination of the torque with respect to a grip rotation angle.

Figure 9:
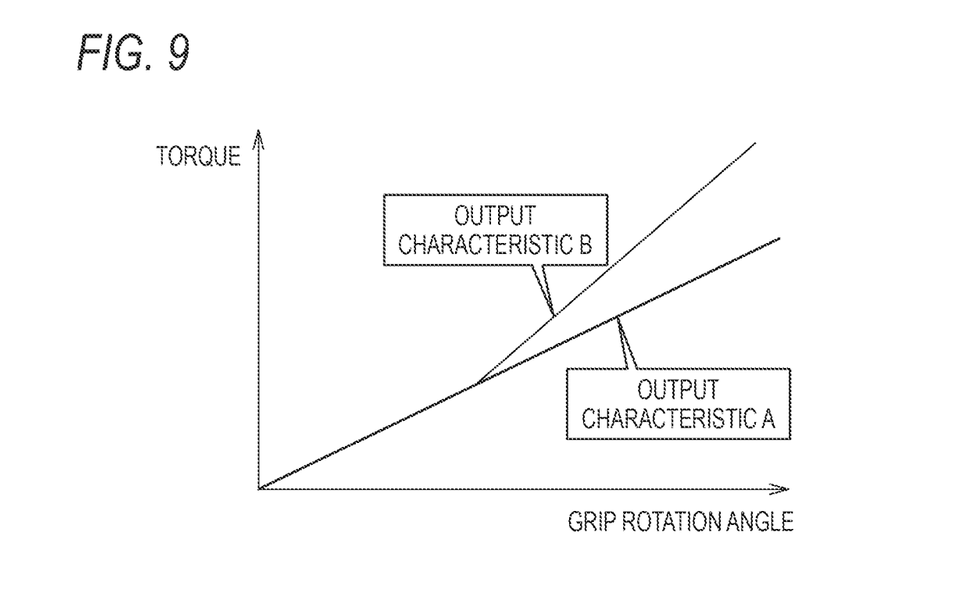
FIG. 9 is a graph showing a second example relating to a change in the output characteristic.
Figure 10:
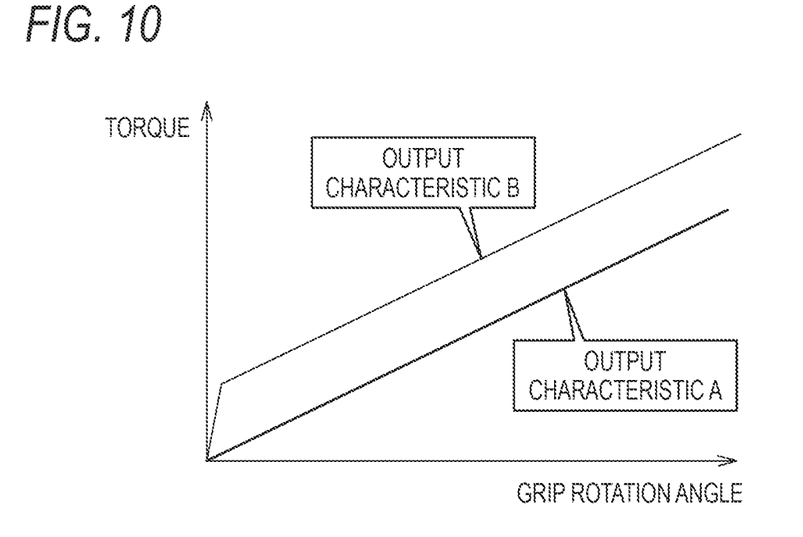
FIG. 10 is a graph showing a third example relating to a change in the output characteristic.
Figure 11:
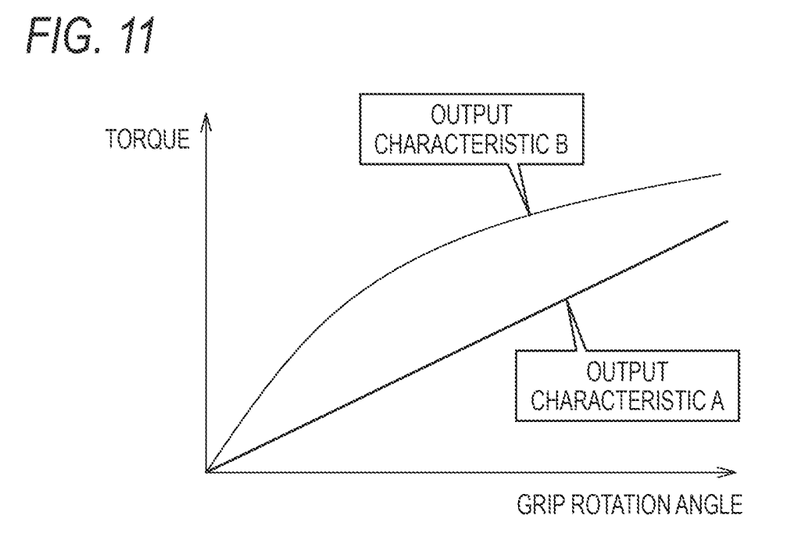
FIG. 11 is a graph showing a fourth example relating to a change in the output characteristic.

As shown in FIG. 9, the output characteristic B may be that the output torque is changed so as to be increased only in a part of the rotation angle range of the grip, as compared with the output characteristic A. As shown in FIG. 10, in relation to a straight line indicating the inclination of the torque with respect to the grip rotation angle, the output characteristic B may be offset in parallel to a torque-increasing side, as compared with the output characteristic A. As shown in FIG. 11, at least one of the output characteristic A or the output characteristic B may be non-linear.

Subsequently, the control unit 46 displays on the meter device 27 a display indicating that the current mode is the boost mode (step S106 in FIG. 7).

Next, the control unit 46 determines a boost ending condition (step S107). This determination can be made based on, for example, at least one of the elapsed time from the start of the operation of boost switch 36, the battery temperature, the remaining amount of charge, the temperature of drive motor 30, and the current amount, but is not limited thereto. The determination criteria may include whether an abnormality has occurred in various devices.

When the control unit 46 determines in step S107 that the boost ending condition is satisfied, the process proceeds to step S103. When the control unit 46 determines that the boost ending condition is not satisfied, the process returns to step S105.

As described above, the motorcycle 1 of the present embodiment includes the output adjusting grip 32 and the boost switch 36. The output adjusting grip 32 is operated rotationally. The boost switch 36 includes the pressed portion 36b. The pressed portion 36b has a portion extending in a direction perpendicular to the rotation axis 32c of the output adjusting grip 32.

As a result, it is easy to press the pressed portion 36b of the boost switch 36 with a thumb when gripping the output adjusting grip 32 and operating the output adjusting grip 32 to any rotational position.

In the motorcycle 1 of the present embodiment, the pressed portion 36b includes the curved second portion 36q extending in a circumferential direction substantially centered on the rotation axis 32c.

As a result, even when the rotational position of the output adjusting grip 32 changes, the feeling when pressing the pressed portion 36b with the thumb is less likely to change.

In the motorcycle 1 of the present embodiment, the dimension L2 of the pressed portion 36b in the direction perpendicular to the rotation axis 32c is larger than the dimension L1 in a direction along the rotation axis 32c (L1<L2).

As a result, it is possible to easily operate the boost switch 36 in a wide rotational operation range of the output adjusting grip 32 without greatly impairing the compactness of the boost switch 36.

In the motorcycle 1 of the present embodiment, the pressed portion 36b is disposed below the rotation axis 32c.

As a result, it is easy to operate the pressed portion 36b with the thumb while the output adjusting grip 32 is rotated for operation.

The motorcycle 1 of the present embodiment includes the kill switch 37 provided separately from the boost switch 36. The kill switch 37 is operated to stop the motorcycle 1. The pressed portion 36b is disposed away from the kill switch 37 in both an axial direction and the circumferential direction.

As a result, it is possible to reduce operation errors of the boost switch 36 and the kill switch 37.

In the motorcycle 1 of the present embodiment, the boost switch 36 is provided swingable about the fulcrum shaft 36c. The fulcrum shaft 36c is disposed opposite to the output adjusting grip 32 with respect to the pressed portion 36b.

As a result, the boost switch 36 that operates like a seesaw can be disposed compactly. By appropriately determining a position of the fulcrum shaft 36c, an operating force of the pressed portion 36b can be reduced.

The motorcycle 1 of the present embodiment includes the case 31 in which the boost switch 36 is disposed. The sensor 36t for detecting an operation of the boost switch 36 is disposed opposite to the output adjusting grip 32 with respect to the pressed portion 36b. As shown in FIG. 4, the throttle sensor 41 for detecting a rotation operation of the output adjusting grip 32 is built in the case 31 on an end portion closer to the output adjusting grip 32.

As a result, it is possible to effectively use a space in the case 31 to dispose the throttle sensor 41 and the sensor 36t of the boost switch 36.

In the motorcycle 1 of the present embodiment, the support portion 36a of the boost switch 36 on which the fulcrum shaft 36c is disposed is disposed inward of the end portions P1 and P2 on both sides of the pressed portion 36b in the direction perpendicular to the rotation axis 32c of the output adjusting grip 32.

As a result, it is possible to reduce distances between a position where the fulcrum shaft 36c is disposed in the boost switch 36 and both end portions of the pressed portion 36b. Therefore, even if the upper end or the lower end of the pressed portion 36b is pressed with the thumb, a force in a twisting direction is less likely to be applied to the fulcrum shaft 36c, and the durability of the boost switch 36 can be enhanced.

In the motorcycle 1 of the present embodiment, an angle range (the angle range A1 shown in FIG. 2) in which the pressed portion 36b extends is ⅓ or more of a rotation angle range of the output adjusting grip 32.

As a result, it is possible to easily operate the boost switch 36 in a wide rotational operation range of the output adjusting grip 32.

The motorcycle 1 of the present embodiment includes the case 31 disposed on a base end of the output adjusting grip 32. The dimension VL1 of the pressed portion 36b in the up-down direction is ⅓ or more of the dimension VL2 of the case 31 in the up-down direction (VL1≥VL2/3).

As a result, it is possible to easily operate the boost switch 36 in a wide rotational operation range of the output adjusting grip 32.

In the motorcycle 1 of the present embodiment, a length (the dimension L2 shown in FIGS. 2 and 6) of the pressed portion 36b in the direction perpendicular to the rotation axis 32c of the output adjusting grip 32 is 2 cm or more.

As a result, it is possible to easily operate the boost switch 36 in a wide rotational operation range of the output adjusting grip 32.

Although the preferred embodiment of the present disclosure has been described above, the above configuration can be modified as follows, for example.

Figure 12:
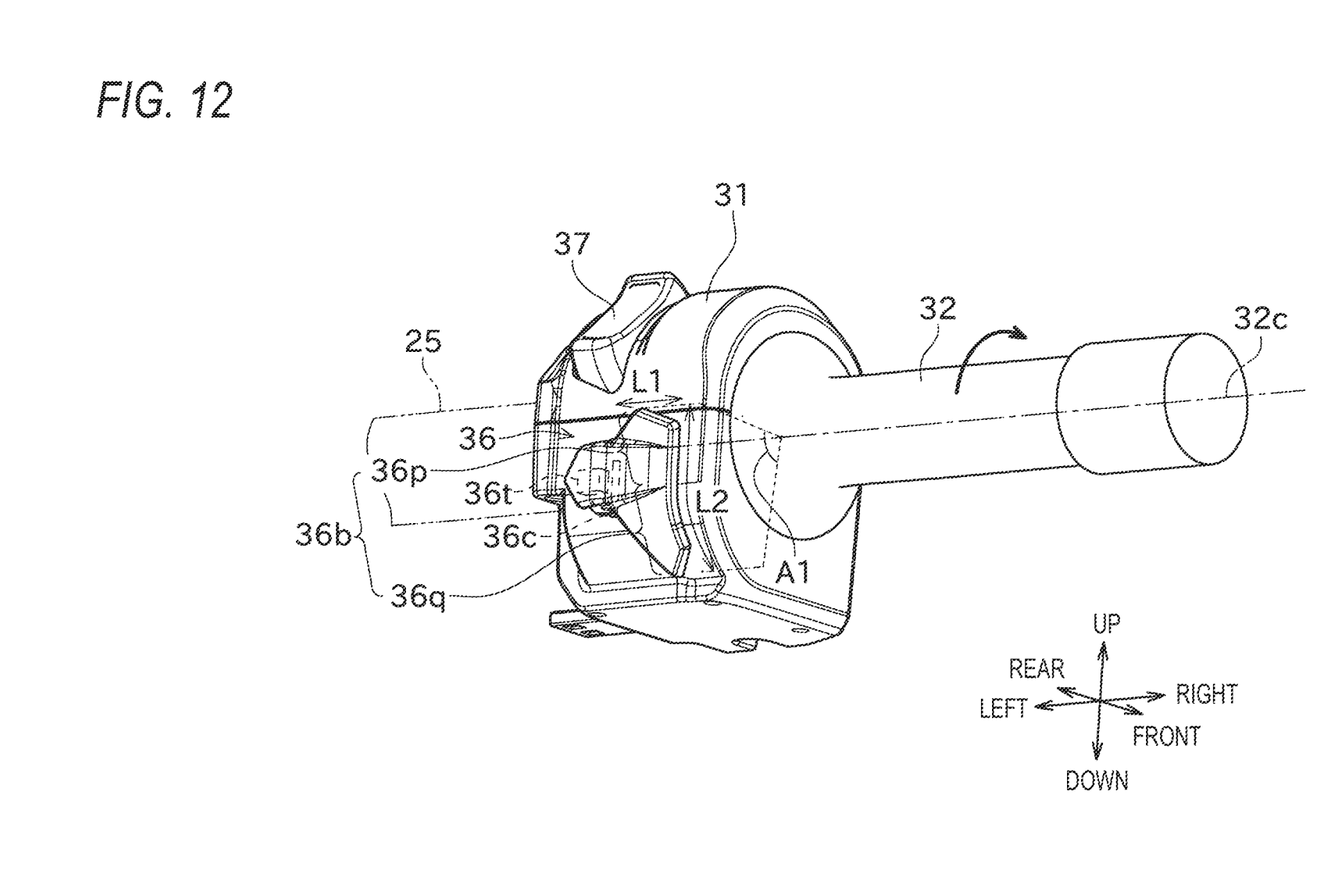
FIG. 12 is a perspective view showing an output adjusting grip and a case according to a modification.

The shape of the pressed portion 36b of the boost switch 36 can be appropriately changed. For example, as shown in a modification of FIG. 12, the lower end of the pressed portion 36b can be formed to be sharp.

For example, the boost switch 36 can be formed in an L shape or a rectangular flat plate shape instead of the lateral T shape.

In the above embodiment, as shown in FIG. 6, the pressed portion 36b is a combination of the first portion 36p extending linearly and the second portion 36q extending curvedly. Alternatively, it is possible to change the entire pressed portion 36b to be linear. It is also possible to change the entire pressed portion 36b into a curved shape (an arc shape).

At least a part of the pressed portion 36*b* may be disposed above the rotation axis 32*c* of the output adjusting grip 32. The upper end of the pressed portion 36*b* may be disposed at an interval in the up-down direction with respect to the rotation axis 32*c*. For example, the upper end of the pressed portion 36*b* may be disposed below the rotation axis 32*c*.

The pressed portion 36*b* may be disposed to overlap the kill switch 37 in either the axial direction or the circumferential direction of the output adjusting grip 32.

The fulcrum shaft 36*c* is positioned anywhere. For example, the fulcrum shaft 36*c* may be disposed closer to the output adjusting grip 32 than the pressed portion 36*b*.

The sensor 36*t* is positioned anywhere. For example, the sensor 36*t* may be disposed closer to the output adjusting grip 32 than the fulcrum shaft 36*c*. The sensor 36*t* may be disposed closer to the output adjusting grip 32 than the pressed portion 36*b*.

The boost switch 36 may be changed to an operation switch operated for another purpose during traveling. For example, an operation switch for switching between a sport mode (output priority) and an economy mode (fuel suppression) may be provided instead of the boost switch 36. The operation switch may be configured to switch on/off a driving assist mode such as slip prevention, wheelie prevention, and ABS control. When the vehicle includes a plurality of drive sources such as an engine and a motor, the operation switch may switch the drive source. Thus, the boost switch may be changed to an operation switch that is operated during traveling regardless of a speed range and an output range. Even when the boost switch is used to change the output characteristics, the change in the output characteristic of the above embodiment is an example, and a case of switching to another change in the output characteristic is also included in the present disclosure. Since the operation switch used instead of the boost switch is disposed close to the output adjusting grip, the operation switch is preferably used for an operation related to the control of the drive source. The operation switch may be used to issue a command other than the control of the drive source. The kill switch 37 may be changed to an operation switch that is operated for another purpose for stopping the vehicle. The kill switch 37 may be omitted.

As a hybrid drive source, instead of the above hybrid system, a hybrid system in which an engine is used as a main power source and a motor is used to assist the drive of the engine may be used. When this type of hybrid is adopted, for example, it is possible to change the torque output characteristic by switching whether to add the drive of the drive motor 30 (drive assist) to the drive of the engine 21.

The propulsion drive source may include only an engine or only an electric motor instead of the hybrid drive source. When the propulsion drive source includes only an engine, the torque output characteristic can be changed by making the opening degree of the throttle valve with respect to the operation position of the output adjusting grip 32 larger than usual. When the propulsion drive source includes only an electric motor, the torque output characteristic can be changed by making the magnitude of a current to be supplied to the electric motor with respect to the operation position of the output adjusting grip 32 larger than usual.

A throttle wire (not shown) may be attached to the throttle tube to mechanically change an angle of the valve body 44 of the throttle valve 45.

The vehicle is not limited to a motorcycle, and may be, for example, a three-wheeled or four-wheeled vehicle. The present disclosure may be applied to a personal watercraft and the like. The present disclosure can be particularly suitably applied to a vehicle including a grip capable of adjusting an output of a propulsion power source by rotating the grip with respect to a handlebar.

What is claimed is:

1. A vehicle comprising:
a grip to be operated rotationally; and
a traveling operation switch including a pressed portion, the traveling operation switch being operated during traveling, wherein
the pressed portion has a portion extending in a direction perpendicular to a rotation axis of the grip and extending in a circumferential direction around the rotation axis, and
the traveling operation switch is configured to change a relation between an operation position of the grip and an output torque, the grip being to be angularly displaced.

2. The vehicle according to claim 1, wherein
the pressed portion has a larger dimension in the direction perpendicular to the rotation axis than a dimension in a direction along the rotation axis.

3. The vehicle according to claim 1, wherein
the pressed portion is disposed below the rotation axis.

4. The vehicle according to claim 1, further comprising:
a stop operation switch to be operated when stopping the vehicle, the stop operation switch being provided separately from the traveling operation switch, wherein
the pressed portion is disposed away from the stop operation switch in at least one of an axial direction and a circumferential direction of the grip.

5. The vehicle according to claim 1,
wherein the pressed portion extends over an angle range of ⅓ or more of a rotation angle range of the grip.

6. The vehicle according to claim 1, further comprising:
a switch housing disposed on a base end of the grip, wherein
a dimension of the pressed portion in an up-down direction is ⅓ or more of a dimension of the switch housing in the up-down direction.

7. The vehicle according to claim 1, wherein
a length of the pressed portion in the direction perpendicular to the rotation axis of the grip is 2 cm or more.

8. The vehicle according to claim 1, further comprising
a handlebar; and
a case fixed to the handlebar, wherein
the grip is supported by the handlebar so as to be angularly displaceable about an axis of a distal end of the handlebar, and
the traveling operation switch is disposed on a rear surface of the case and is elongated substantially in an up-down direction.

9. The vehicle according to claim 1, wherein
the traveling operation switch is for operation in association with control of a drive source during the traveling.

10. The vehicle according to claim 1, wherein
the traveling operation switch is a mode change switch or a switch for changing output characteristics.

11. The vehicle according to claim 1, wherein the grip is an output adjusting grip configured to change an output of the vehicle depending on an angular displacement of the output adjusting grip.

12. The vehicle according to claim 1, wherein the grip includes a grip sensor configured to detect an amount of an angular displacement of the grip.

13. A vehicle comprising:
a grip to be operated rotationally; and a traveling operation switch including a pressed portion, the traveling operation switch being operated during traveling, wherein the pressed portion has a portion extending in a direction perpendicular to a rotation axis of the grip and extending in a circumferential direction around the rotation axis, the traveling operation switch is provided swingable about a fulcrum shaft, and the fulcrum shaft is disposed opposite to the grip with respect to the pressed portion.

14. The vehicle according to claim 13, further comprising:
a switch housing in which the traveling operation switch is disposed,
a sensor for detecting an operation of the traveling operation switch, the sensor being disposed opposite to the grip with respect to the pressed portion, and
a grip sensor for detecting a rotation operation of the grip, the grip sensor being built in the switch housing at an end portion on a side closer to the grip.

15. The vehicle according to claim 13, wherein
the traveling operation switch includes a support portion where the fulcrum shaft is disposed in the traveling operation switch; and
the support portion is disposed inward of both ends of the pressed portion in the direction perpendicular to the rotation axis of the grip.

16. A vehicle comprising:
a grip to be operated rotationally; and
a traveling operation switch including a pressed portion, the traveling operation switch being operated during traveling, wherein
the pressed portion has a portion extending in a direction perpendicular to a rotation axis of the grip and extending in a circumferential direction around the rotation axis, and the pressed portion has a first portion extending along a tangential direction of an outer periphery of the grip and a second portion in a circumferential direction around a rotation axis of the grip.

17. A vehicle comprising:
a grip to be operated rotationally;
a traveling operation switch including a pressed portion;
a switch housing in which the traveling operation switch is disposed;
a sensor for detecting an operation of the traveling operation switch, the sensor being disposed opposite to the grip with respect to the pressed portion; and
a grip sensor for detecting a rotation operation of the grip, the grip sensor being built in the switch housing at an end portion on a side closer to the grip,
wherein the pressed portion has a portion extending in a direction perpendicular to a rotation axis of the grip.

18. A vehicle comprising:
a grip to be operated rotationally; and
a traveling operation switch including a pressed portion, wherein
the pressed portion has a portion extending in a direction perpendicular to a rotation axis of the grip,
the traveling operation switch is provided swingable about a fulcrum shaft,
the fulcrum shaft is disposed opposite to the grip with respect to the pressed portion,
the traveling operation switch includes a support portion where the fulcrum shaft is disposed in the traveling operation switch, and
the support portion is disposed inward of both ends of the pressed portion in the direction perpendicular to the rotation axis of the grip.

* * * * *